US009110293B2

United States Patent
Hall

(10) Patent No.: US 9,110,293 B2
(45) Date of Patent: Aug. 18, 2015

(54) PRISMATIC IMAGE REPLICATION FOR OBTAINING COLOR DATA FROM A MONOCHROME DETECTOR ARRAY

(71) Applicant: Manufacturing Techniques, Inc. (MTEQ), Kilmarnock, VA (US)

(72) Inventor: John M. Hall, Stafford, VA (US)

(73) Assignee: Manufacturing Techniques, Inc., Kilmarnock, VA (US)

( * ) Notice: Subject to any disclaimer, the term of this patent is extended or adjusted under 35 U.S.C. 154(b) by 310 days.

(21) Appl. No.: 13/573,958

(22) Filed: Oct. 16, 2012

(65) Prior Publication Data

US 2013/0092819 A1 Apr. 18, 2013

Related U.S. Application Data

(60) Provisional application No. 61/547,867, filed on Oct. 17, 2011.

(51) Int. Cl.
*G02B 27/10* (2006.01)
*G02B 27/12* (2006.01)
*H04N 5/33* (2006.01)
*H04N 9/04* (2006.01)

(52) U.S. Cl.
CPC .......... *G02B 27/1013* (2013.01); *G02B 27/126* (2013.01); *H04N 5/33* (2013.01); *H04N 9/045* (2013.01)

(58) Field of Classification Search
USPC ............ 250/208.1, 214.1, 214 R, 208.2, 216, 250/226; 348/281, 282, 294, 302; 257/431, 257/432, 433
See application file for complete search history.

(56) References Cited

U.S. PATENT DOCUMENTS

| | | | |
|---|---|---|---|
| 3,604,839 A | 9/1971 | Kitsopoulos | |
| 3,767,290 A | 10/1973 | Lang et al. | |
| 3,971,065 A | 7/1976 | Bayer | |
| 4,009,951 A | 3/1977 | Ihms | |
| 4,035,836 A | 7/1977 | Miyaji et al. | |
| 4,507,679 A | 3/1985 | Bendell | |
| 4,673,269 A | 6/1987 | Schiff et al. | |
| 4,762,989 A * | 8/1988 | Motooka | 250/216 |
| 5,066,101 A | 11/1991 | Aoki et al. | |
| 5,214,503 A | 5/1993 | Chiu et al. | |
| 5,528,295 A | 6/1996 | Wagner | |
| 5,756,989 A | 5/1998 | Bear et al. | |
| 6,292,212 B1 | 9/2001 | Zigadlo et al. | |
| 6,570,147 B2 | 5/2003 | Smith | |
| 6,704,144 B2 | 3/2004 | Huang | |
| 6,801,359 B1 | 10/2004 | Engelhardt et al. | |
| 6,856,464 B1 | 2/2005 | Poradish et al. | |
| 7,224,531 B2 | 5/2007 | Ho et al. | |
| 7,270,424 B2 | 9/2007 | Ho | |
| 7,411,734 B2 | 8/2008 | Magarill et al. | |
| 7,507,964 B2 | 3/2009 | Jones et al. | |

(Continued)

*Primary Examiner* — Francis M Legasse, Jr.
(74) *Attorney, Agent, or Firm* — The Webb Law Firm

(57) ABSTRACT

An optical system for producing color images includes: an objective lens system having an entrance aperture; a multi-faceted prism positioned at the entrance aperture of the objective lens system and including at least a first face having a first optical filter formed thereon and a second face having a second optical filter formed thereon; and a monochromatic detector array positioned to receive light from the objective lens system. The multi-faceted prism intercepts light from a scene and splits a pupil of the objective lens system into two or more spectrally separated sub-images which are projected onto the monochromatic detector array.

20 Claims, 2 Drawing Sheets

(56) References Cited

U.S. PATENT DOCUMENTS

| | | |
|---|---|---|
| 7,529,029 B2 | 5/2009 | Duncan et al. |
| 7,722,534 B2 | 5/2010 | Cline et al. |
| 7,839,571 B2 | 11/2010 | Saita et al. |
| 7,868,936 B2 | 1/2011 | Ajito et al. |
| 7,916,203 B2 | 3/2011 | Harada et al. |
| 7,944,559 B2 | 5/2011 | Oskotsky et al. |
| 2001/0043403 A1 | 11/2001 | Engelhardt |
| 2002/0057500 A1 | 5/2002 | Sugawara |
| 2003/0007252 A1 | 1/2003 | Saita |
| 2005/0162737 A1 | 7/2005 | Whitehead et al. |
| 2008/0228037 A1* | 9/2008 | Cline et al. ............ 600/160 |
| 2009/0251569 A1 | 10/2009 | Nonaka |
| 2010/0091089 A1 | 4/2010 | Cromwell et al. |

\* cited by examiner

PRISMATIC IMAGE REPLICATION FOR OBTAINING COLOR DATA FROM A MONOCHROME DETECTOR ARRAY

CROSS REFERENCE TO RELATED APPLICATIONS

This application claims the benefit of U.S. Provisional Patent Application No. 61/547,867 entitled "Prismatic Image Replication for Obtaining Color Data from a Monochrome Detector Array" filed Oct. 17, 2011, which is hereby incorporated by reference in its entirety.

BACKGROUND OF THE INVENTION

1. Field of the Invention

The present invention is generally directed to an optical technique for producing color images and, more particularly, to an optical technique that allows a single, monochromatic detector focal plane array to produce a color or otherwise spectrally separated image through the use of a multi-faceted prism that is attached to the front end of a typical objective lens system.

2. Description of Related Art

Most photo-detector materials respond over relatively broad regions of the electromagnetic spectrum. For proper color rendering of red, green, and blue primary colors, it is necessary to employ some type of optical filtering. For example, silicon-based detectors such as CCD and CMOS arrays, normally respond over the entire wavelength band from 0.4 to 1.0 microns, which includes not only red, green, and blue wavelengths but also a good portion of the infrared spectrum. Infrared detectors responding anywhere between 0.8 to 14 microns, such as image intensifier tubes or arrays made of InGaAs, HgCdTe, or InSb, are much more expensive to manufacture and typically are not available with integral Bayer-type filters (see U.S. Pat. No. 3,971,065). Since the cost of multiple arrays is very high, typically the best method of obtaining color information in infrared sensors is by using either a filter wheel or a scanned grating/prism assembly. However, these options require either moving parts or fragile materials and may not be suitable for many applications, such as, for example, a gun-mounted sensor which has to survive extreme shock conditions.

The manner in which color video is normally obtained from conventional broad band detectors generally falls into one of the following categories. A first method is to employ separate focal plane detector assemblies that are bundled together using split-path optics. Each path includes its own unique color filter. A typical color camera system would thus have three separate detector arrays, one each for red, green, and blue. However, the requirement for split-path optical components and the need for multiple camera detectors and readout electronics makes this option relatively expensive.

Alternatively, a filter wheel or liquid crystal color separator can be placed in front of a single detector. The wheel contains optical filter elements that pass the desired set of color bands. The liquid crystal shutter alters its transmission properties so as to pass only certain colors of light. As the wheel turns or the liquid crystal alters state, each color is read out by the detector one at a time. This technique is often called "field sequential color". The disadvantage of such a method is that the color images are not taken simultaneously.

An additional technique is to modify the focal plane pixel array on a pixel-by-pixel basis, such that individual pixels have filters applied (e.g., a Bayer filter). This reduces the effective monochromatic resolution of the array in exchange for the color information. The Bayer filter approach is common in many low-cost commercial CCD and CMOS camera products, as it provides adequate resolution in a relatively low-cost sensor assembly containing a single focal plane array.

Finally, color images can be obtained by providing the objective lens optics with a grating, prism, or linear variable filter, which generally separates the colors into linear bands, and then these bands are scanned across a focal plane array. Coordination of the scanner and the array readout allows very precise readout of specific colors, and, in fact, a great number of color bands can be obtained over a period of time. This is the basis of operation for most "hyperspectral" sensors which tend to be expensive and complex.

Accordingly, a need exists for an optical system and method by which a single monochromatic detector array can be made to provide color band image information with no moving parts and with minimal complexity.

SUMMARY OF THE INVENTION

An object of the present invention is to provide an optical system and method by which a single monochromatic detector array can be made to provide color band image information with no moving parts and with minimal complexity. More specifically, the present invention is directed to an optical system and method that allows a single, monochromatic detector focal plane array to produce a color or otherwise spectrally separated image through the use of a multi-faceted prism that is attached to the front end of a typical objective lens system. The optical system and method then provides two or more images (one per facet of the prism) located side-by-side on the focal plane of the monochromatic detector array, with each image containing light from a desired color spectral band. When combined with an image processor that can address and manipulate pixels in various regions of the detector array, the result is that color information can be obtained and utilized from an otherwise monochromatic, broad-band detector array. This optical system and method is particularly useful when spectral information is needed from a high density infrared focal plane array detector, which normally does not provide any substantial color or spectral information, but does provide enough pixels where adequate image resolution is obtained from a fraction of the array.

Accordingly, provided is an optical system for producing color images. The optical system includes: an objective lens system having an entrance aperture; a multi-faceted prism positioned at the entrance aperture of the objective lens system and including at least a first face having a first optical filter formed thereon and a second face having a second optical filter formed thereon; and a monochromatic detector array positioned to receive light from the objective lens system. The multi-faceted prism intercepts light from a scene and splits a pupil of the objective lens system into two or more spectrally separated sub-images which are projected onto the monochromatic detector array.

The first face and the second face of the multi-faceted prism may be aligned with an optical axis of the objective lens system. The multi-faceted prism may be manufactured from a refracting material that transmits radiation in a predetermined broad spectral band. The refracting material may be optical glass or crystalline materials, such as $CaF_2$, Ge, or ZnSe which are common in infrared and multi/hyperspectral applications. The first optical filter may be configured to permit a first portion of the predetermined broad spectral band to pass therethrough and the second optical filter may be configured to permit a second portion of the predetermined broad spectral band to pass therethrough.

Stray radiation from the multi-faceted prism may be limited with at least one of a honeycomb structure and a long tube affixed to an entrance aperture of the optical system. Alternatively, radiation from the multi-faceted prism and the objective lens system may be limited by a color filter applied in proximity to the monochromatic detector array.

The multi-faceted prism may be provided in a housing that is removably attached to the objective lens system. This provides the multi-faceted prism with the ability to be mounted and dismounted to any standard camera objective lens. An image processing device may be used to combine the two or more spectrally separated sub-images into a single color image.

In addition, provided is a method for producing color images that includes providing an optical system having: an objective lens system with an entrance aperture; a multi-faceted prism positioned at the entrance aperture of the objective lens system and including at least a first face having a first optical filter formed thereon and a second face having a second optical filter formed thereon; and a monochromatic detector array positioned to receive light from the objective lens system, intercepting light from a scene with the multi-faceted prism. The method also includes: splitting a pupil of the objective lens system into two or more spectrally separated sub-images; and projecting the two or more spectrally separated sub-images onto the monochromatic detector array.

The method may also include combining the two or more spectrally separated sub-images into a single color image using an image processing device.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
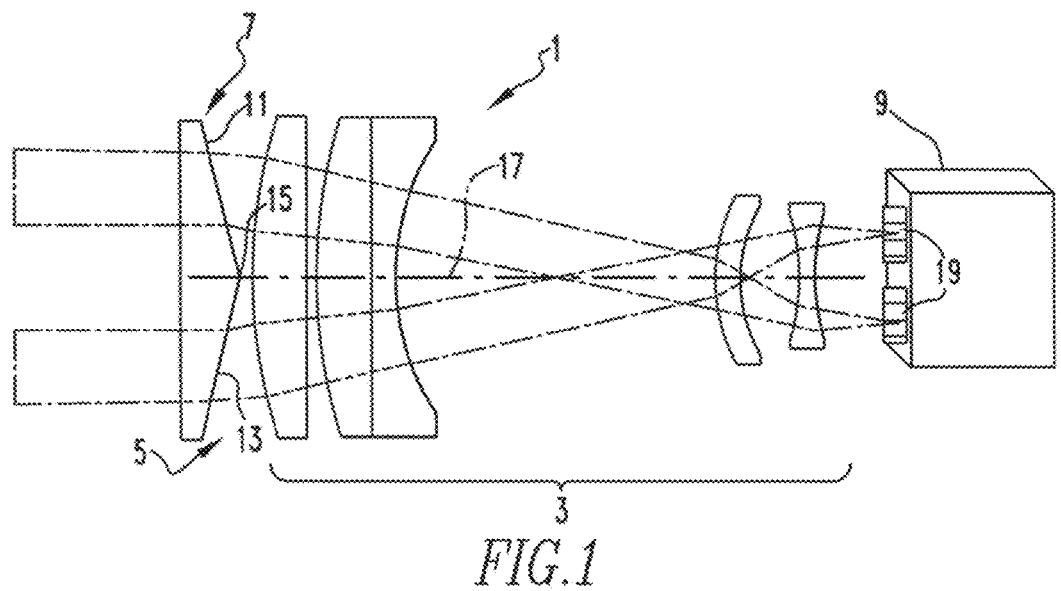
FIG. 1 is a schematic view of an optical system that provides prismatic replication for obtaining color data from a monochromatic detector array in accordance with the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

With reference to FIG. 1, an optical system, denoted generally as reference numeral 1, for producing color images includes an objective lens system 3 having an entrance aperture 5; a multi-faceted prism 7 positioned at the entrance aperture 5 of the objective lens system 3 and; a monochromatic detector array 9 positioned to receive light from the objective lens system 3. The multi-faceted prism 7 includes at least a first face 11 having a first optical filter formed thereon and a second face 13 having a second optical filter formed thereon.

While the prism 7 was discussed hereinabove as being located at the entrance aperture 5 of the objective lens system 3, this is not to be construed as limiting the present invention as the prism 7 may be provided at any internal projection of the entrance aperture 5 of an objective lens system 3. The objective lens system 3 can be nearly any conventional camera objective lens assembly.

Figure 2:
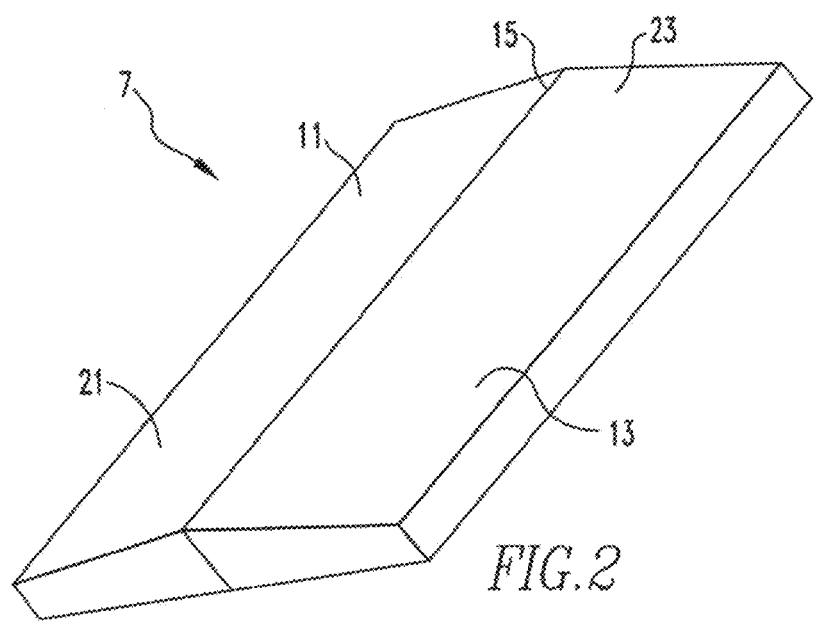
FIG. 2 is a perspective view of a multi-faceted prism for use with the optical system of FIG. 1.

With reference to FIG. 2 and with continued reference to FIG. 1, the prism 7 has two or more faces 11, 13 and an apex 15 thereof is aligned with an optical axis 17 of the objective lens system 3. The angles of the faces 11, 13 are designed to split the pupil of the objective lens system 3 and create identical sub-images 19 of the projected scene onto the detector array 9. These sub-images 19 are separated spatially as shown in FIG. 1. The prism 7 is made of a refracting material which transmits radiation in a predetermined broad spectral band defined by the detector array 9. Each prism face 11, 13 is coated with an optical filter 21, 23 that permits only a subset of the total broad spectral band to pass therethrough. Therefore, each sub-image 19 on the detector array 9 represents the scene in a desired color band.

More specifically, the prism 7 is made of a refracting material which passes the broad spectrum defined by the detector array 9. The refracting material may be optical glass or crystalline materials, such as $CaF_2$, Ge, or ZnSe which are common in infrared and multi/hyperspectral applications. The faces 11, 13 of the prism 7 are then coated with bandpass optical filters 21, 23 that limit transmissions to only portions of the broad spectral band, thereby producing a "color" as desired by the filter design. In a visible TV camera system, the colors may be the normal red, green, and blue or perhaps cyan, yellow, and magenta. In an infrared camera system, there are no standard named "colors", but the concept is the same and sections of the broad band can be extracted. While FIG. 2 illustrates a two-facet prism configured to generate sub-images of two different colors, this is not to be considered as limiting the present invention as the prism may have any suitable number of faces to produce any suitable number of sub-images. In addition, prism 7 may be provided in a housing that is configured to be removably attached to the objective lens system 3 of any standard camera.

Depending upon the field of view of the original objective lens system 3, the sub-images 19 may be too large for the detector array 9 and, thus, would overlap. This issue can be addressed in one of two ways. First, a honeycomb structure (not shown), such as the KillFlash products marketed by Tenebraex Corp., can be applied in front of the prism 7 to reduce the field of view of the objective lens system 3. Alternatively, a color filter plate (not shown) can be applied directly over the detector array 9 with color filter characteristics matching the desired location and color band of each sub-image 19. The filter plate corresponds to the desired prism face color band and rejects any stray or overlapping imaging from the other faces.

Figure 3:
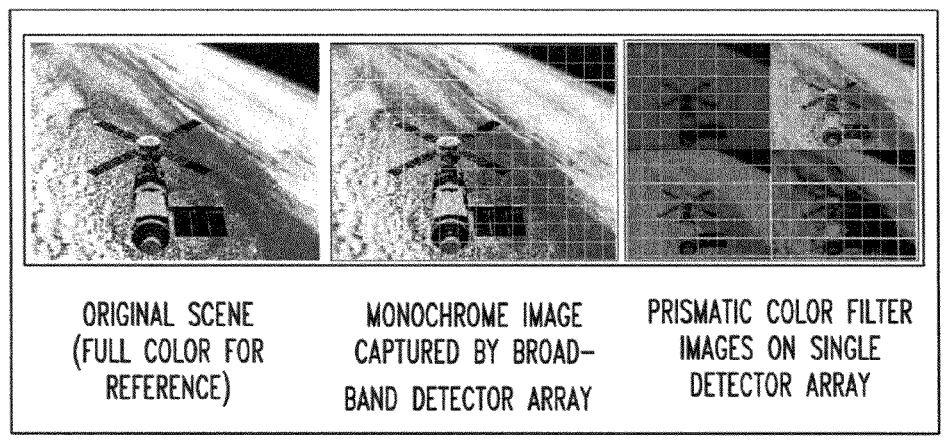
FIG. 3 is a computer-generated example of a four color image obtained using an optical system and method in accordance with the present invention.

With reference to FIG. 3, once the color-coded sub-images 19 are collected by the detector array 9, the pixels may be electrically processed in a variety of ways. It is thus possible to combine the sub-images into a single color image, and it is also possible to analyze the differences between the color rendered scenes and use that information to perform various tasks such as recognition of certain materials or electromagnetic emissions.

Accordingly, the present invention provides an optical system 1 by which a single monochromatic detector array 9 can be made to provide color band image information with no moving parts and with minimal complexity. More specifically, the system produces two or more sub-images 19, each in a different color band, on a single detector array 9 with no moving parts while allowing for real-time, simultaneous image capture.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. An optical system for producing color images comprising:
    an objective lens system having an entrance aperture;
    a multi-faceted prism positioned at the entrance aperture of the objective lens system and comprising at least a first face having a first optical filter formed thereon and a second face having a second optical filter formed thereon; and
    a single monochromatic detector array positioned to receive light from the objective lens system,
    wherein the multi-faceted prism intercepts light from a scene and splits a pupil of the objective lens system into two or more spectrally separated sub-images which are projected onto the monochromatic detector array.

2. The optical system of claim 1, wherein the first face and the second face of the multi-faceted prism are aligned with an optical axis of the objective lens system.

3. The optical system of claim 1, wherein the multi-faceted prism is manufactured from a refracting material that transmits radiation in a predetermined broad spectral band.

4. The optical system of claim 2, wherein the refracting material is optical glass, a crystalline material, or any combination thereof.

5. The optical system of claim 2, wherein the first optical filter permits a first portion of the predetermined broad spectral band to pass therethrough and the second optical filter permits a second portion of the predetermined broad spectral band to pass therethrough.

6. The optical system of claim 1, wherein stray radiation from the multi-faceted prism is limited with at least one of a honeycomb structure and a long tube affixed to an entrance aperture of the optical system.

7. The optical system of claim 1, wherein stray radiation from the multi-faceted prism and the objective lens system is limited by a color filter applied in proximity to the monochromatic detector array.

8. The optical system of claim 1, wherein the multi-faceted prism is provided in a housing that is removably attached to the objective lens system.

9. The optical system of claim 1, wherein an imaging processing device is used to combine the two or more spectrally separated sub-images into a single color image.

10. A method for producing color images comprising:
    providing an optical system comprising:
        an objective lens system having an entrance aperture;
        a multi-faceted prism positioned at the entrance aperture of the objective lens system and comprising at least a first face having a first optical filter formed thereon and a second face having a second optical filter formed thereon; and
        a single monochromatic detector array positioned to receive light from the objective lens system,
    intercepting light from a scene with the multi-faceted prism;
    splitting a pupil of the objective lens system into two or more spectrally separated sub-images; and
    projecting the two or more spectrally separated sub-images onto the monochromatic detector array.

11. The method of claim 10, wherein the first face and the second face of the multi-faceted prism are aligned with an optical axis of the objective lens system.

12. The method of claim 10, wherein the multi-faceted prism is manufactured from a refracting material that transmits radiation in a predetermined broad spectral band.

13. The method of claim 12, wherein the refracting material is optical glass, a crystalline material, or any combination thereof.

14. The method of claim 12, wherein the first optical filter permits a first portion of the predetermined broad spectral band to pass therethrough and the second optical filter permits a second portion of the predetermined broad spectral band to pass therethrough.

15. The method of claim 10, wherein stray radiation from the multi-faceted prism is limited with at least one of a honeycomb structure and a long tube affixed to an entrance aperture of the optical system.

16. The method of claim 10, wherein stray radiation from the multi-faceted prism and the objective lens system is limited by a color filter applied in proximity to the monochromatic detector array.

17. The method of claim 10, wherein the multi-faceted prism is provided in a housing that is removably attached to the objective lens system.

18. The method of claim 10, further comprising combining the two or more spectrally separated sub-images into a single color image using an image processing device.

19. An optical system for producing color images comprising:
    an objective lens system having an entrance aperture;
    a multi-faceted prism positioned within a housing that is removably connected to the objective lens system at the entrance aperture of the objective lens system, the multi-faceted prism comprising at least a first face having a first optical filter formed thereon and a second face having a second optical filter formed thereon; and
    a single monochromatic detector array positioned to receive light from the objective lens system,
    wherein the multi-faceted prism intercepts light from a scene and splits a pupil of the objective lens system into two or more spectrally separated sub-images which are projected onto the monochromatic detector array.

20. The optical system of claim 19, wherein the first face and the second face of the multi-faceted prism are aligned with an optical axis of the objective lens system.

* * * * *